United States Patent [19]

Matsumoto et al.

[11] Patent Number: 5,242,635
[45] Date of Patent: Sep. 7, 1993

[54] METHOD OF PRODUCING POROUS MATERIAL HAVING OPEN PORES

[75] Inventors: Akio Matsumoto, Kitakyushu; Yutaka Tomioka, Yukuhashi, both of Japan

[73] Assignee: Toto Ltd., Kitakyushu, Japan

[21] Appl. No.: 808,235

[22] Filed: Dec. 16, 1991

[30] Foreign Application Priority Data

Aug. 16, 1991 [JP] Japan .................................. 3-205767

[51] Int. Cl.$^5$ .............................................. B29C 67/20
[52] U.S. Cl. .................................... 264/41; 264/331.12
[58] Field of Search ................. 264/41, 331.11, 331.12

[56] References Cited

U.S. PATENT DOCUMENTS

| 4,797,425 | 1/1989 | Kishima et al. | |
| 4,818,453 | 4/1989 | Inoue et al. | 264/41 |
| 4,884,959 | 12/1989 | Ito et al. | 425/84 |

FOREIGN PATENT DOCUMENTS

| 0147494 | 7/1985 | European Pat. Off. | |
| 53-2464 | 1/1978 | Japan . | |
| 03-103461 | 4/1991 | Japan . | |
| 2209339A | 5/1989 | United Kingdom . | |

*Primary Examiner*—Leo B. Tentoni
*Attorney, Agent, or Firm*—Oblon, Spivak, McClelland, Maier & Neustadt

[57] ABSTRACT

A method of producing a porous material having open pores including stirring a mixture including (i) an epoxy compound having at least one epoxy ring in the compound, (ii) a hardener capable of reacting with the epoxy compount to harden the epoxy compound, (iii) a filler and (iv) water to form an emulsion slurry having a low viscosity and containing the soluble salts uniformly dispersed therein, casting the resulting emulsion slurry in a water impermeable mold and then hardening the slurry while maintaining the water content thereof, and wherein the soluble salts are added to the mixture. The method makes it possible to produce a large scale porous material having open pores and a complicated shape whose shrinkage factor during hardening and water and air permeabilities are controlled to desired levels respectively while scattering thereof is reduced.

8 Claims, 3 Drawing Sheets

METHOD OF PRODUCING POROUS MATERIAL HAVING OPEN PORES

BACKGROUND OF THE INVENTION

The present invention relates to a method of producing a porous material having open pores. More particularly, the present invention pertains to a method of producing a porous material having open pores from a mixture which comprises (i) an epoxy compound having at least one epoxy ring in the compound, (ii) a hardener which can react with the epoxy compound to cause hardening thereof, (iii) a filler and (iv) water to which soluble salts are further added.

Hitherto, there have been proposed a variety of methods for producing porous materials having open pores and used as a filtering medium, air diffusion medium, casting mold and so forth; for instance, sintering of metal powder, sintering of thermoplastic resin powder, sintering of inorganic powder, hydration setting of cement or the like, press molding or stamping of a mixture of a thermoplastic and a filler, hardening of a resin solution comprising a pore-forming agent followed by the removal of the pore-forming agent through dissolution, extraction or evaporation, use of a foaming agent, polymerization for hardening a W/0 emulsion such as a water-containing polyester resin followed by evaporation of the water from the hardened mass.

However, these known methods of producing porous materials having open pores inevitably suffer from one or more of problems concerning molding, such as that the products prepared by these methods are considerably limited as to their shapes and sizes, that these methods require the use of a heat treatment at a high temperature and/or high-pressure pressing and that the manufacturing processes are very complicated.

Moreover, these known methods have another problem in that it is very difficult to precisely control the pore size of the product. The control of the pore size is the most important factor in the production of porous materials having open pores used as filtering mediums and air diffusion mediums.

As a method of producing porous materials having open pores which can solve the foregoing problems and which can provide a large scale porous material having open pores, a complicated shape and a desired pore size with good dimensional accuracy, there has been known a method which comprises preparing an emulsion slurry by mixing an epoxy resin, a hardening agent, a filler and water and stirring the mixture to obtain an emulsion slurry, hardening the resulting slurry while maintaining the water content thereof and then removing the water from the hardened mass to form open pores therein. For instance, Japanese Examined Patent Publication (hereinafter referred to as "J.P. KOKOKU") No. 2464/1978 achieves a desired object by preparing an O/W type emulsion slurry from a mixture comprising a glycidyl type epoxy resin, a polymeric fatty acid polyamide hardener, a filler and water, casting the slurry in a water-impermeable mold, hardening the slurry while maintaining the water content thereof and then dehydrating the hardened mass. This conventional method makes it possible to form a large scale porous material having open pores and a complicated shape with good dimensional accuracy and to precisely control the pore size thereof by adjusting the particle size of the filler, the amount of a reactive diluent and the relative compounding ratio among the epoxy resin, hardener, filler and water, but the pore size of the porous material prepared by this method is very small of the order of not more than 1.5 μm and, therefore, the material is impracticable for use as filtering mediums, air diffusion mediums and casting molds.

This problem can be solved by a method of producing a porous material having open pores disclosed in J.P. KOKOKU No. 26657/1987, which comprises preparing a hardener by admixing an amide compound obtained through the reaction of a monomeric fatty acid with an ethyleneamine: $H_2N-(CH_2-CH_2-NH)_n-H$ (wherein n is an integer ranging from 3 to 5) and a polymerized fatty acid polyamide obtained through the reaction of a polymerized fatty acid with the foregoing ethyleneamine, or by mixing and reacting the monomeric fatty acid, the polymerized fatty acid and the ethyleneamine to obtain a mixed reaction product, vigorously stirring a mixture comprising a bisphenol type epoxy resin, the hardener, a filler and water to obtain an emulsion slurry, casting the slurry in a water impermeable mold, hardening the slurry while maintaining the water content thereof and then dehydrating the hardened mass. This method permits the formation of a large scale porous material having open pores, whose average pore size ranges from 0.5 to 10 μm, preferably 0.5 to 5 μm, and in particular 1.5 to 5 μm with good dimensional accuracy. In addition, Japanese Unexamined Patent Publication (hereinafter referred to as "J.P. KOKAI") No. 75044/1988 likewise proposes a method of producing a porous material having open pores and a pore size ranging from 0.2 to 10 μm which comprises preparing an emulsion slurry from a mixture containing a glycidyl type epoxy resin, a polyamide hardener and a modified polyamide hardener and/or an amine hardener, a filler, and water, and then casting the slurry in a water impermeable mold, hardening the slurry while maintaining the water content thereof and then dehydrating the hardened mass.

However, though these methods permit control of the pore size of the resulting porous material, they cannot provide porous materials having open pores having a relation between the pore size and the air and water permeabilities which is always kept unchanged. More specifically, the water and air permeabilities are sometimes insufficient even if the pore size is satisfactorily large. This uniformity in the relation between the pore size and air and water permeabilities of the porous material having open pores is very important when the porous material is used as filtering mediums, air diffusion mediums and casting molds used in industry. Also, control of the water and air permeabilities of porous materials is very important in industrial applications thereof, but it has been impossible to control them according to the conventional techniques.

Furthermore, it is necessary to eliminate the scattering in shrinkage of porous material encountered during hardening of the same if high dimensional accuracy is required, but the conventional techniques cannot solve this problem at all.

SUMMARY OF THE INVENTION

Accordingly, the object of the present invention is to establish a method of producing a porous material having open pores which does not suffer from the foregoing problems associated with the conventional methods.

The inventors of this invention have investigated, in detail, the hardening process of an emulsion slurry obtained from a system comprising an epoxy resin, a hardener, a filler and water, and have found out that the quantity of shrinkage of the porous material produced from the slurry is scattered due to variation in the cohesive force of the emulsion slurry and that the scattering in the kinds and amounts of soluble salts present in the emulsion slurry is a cause of the variation of the cohesive force. In addition, the inventors have further found out that the instability of the water and air permeabilities of the porous material is greatly dependent upon the proportion of the space in the pores occupied by independent polymer resin particles or the extent of loading of the pores by the resin particles and that the amount of the independent polymer resin particles present in the pores is closely related to the magnitude of the cohesive force of the emulsion slurry.

According to the present invention, there is provided a method of producing a porous material having open pores in which soluble salts are compulsorily added to an emulsion slurry comprising an epoxy compound having at least one epoxy ring in the molecule, a hardener capable of reacting with the epoxy compound to harden the same, a filler and water for controlling the shrinkage of the slurry during hardening and water and air permeabilities of the resulting porous material to desired values respectively while reducing the scattering in the shrinkage as well as the water permeability and the air permeability.

DESCRIPTION OF THE DRAWINGS

Other objects, features and advantages of the present invention will become apparent from the following description, taken with reference to the accompanying drawings, in which.

DESCRIPTION OF THE INVENTION INCLUDING PREFERRED EMBODIMENTS

Figure 1:
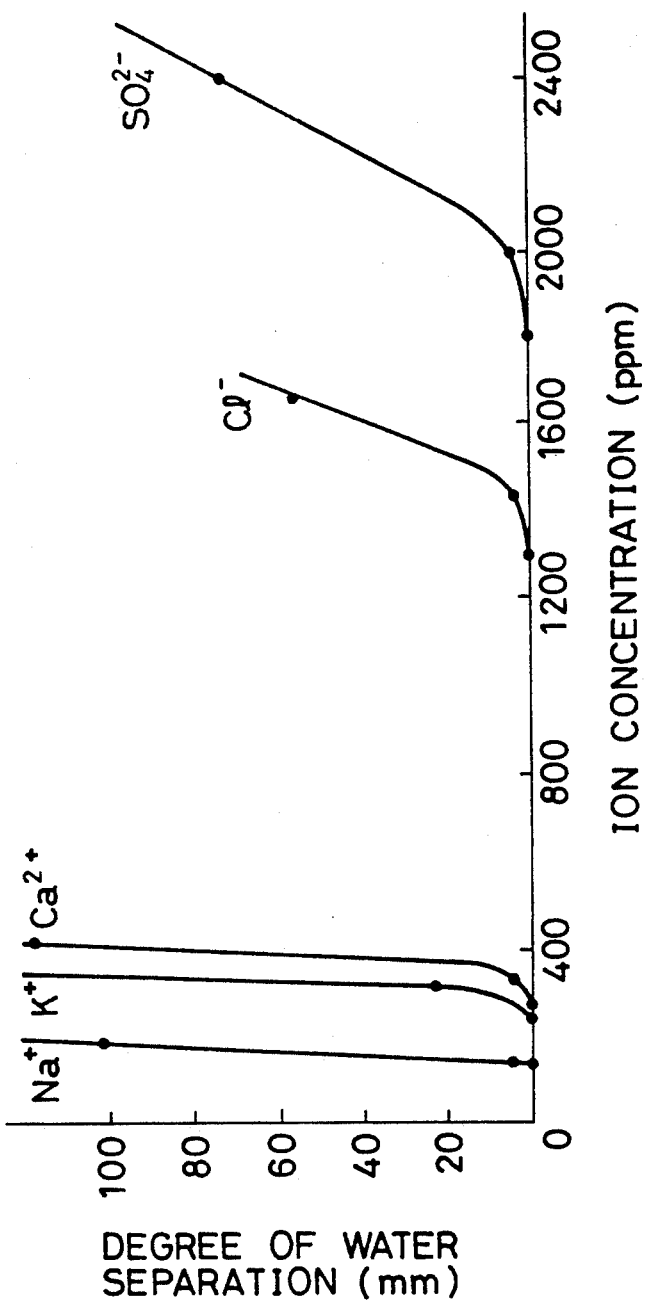
FIG. 1 is a diagram showing the relation between the quantity of water separated from an emulsion (degree of water separation) and the kinds of soluble salts present in the emulsion.

The present invention relates to a method of producing a porous material having open pores which comprises forming an emulsion slurry by stirring a mixture comprising (i) an epoxy compound having at least one epoxy ring in the compound, (ii) a hardener capable of reacting with the epoxy compound to harden the same, (iii) a filler and (iv) water, casting the resulting emulsion slurry in a water impermeable mold and then hardening the slurry while maintaining the water content thereof, wherein soluble salts are added to the mixture.

Preferred soluble salts are inorganic salts capable of releasing monovalent and bivalent cations as well as monovalent and bivalent anions and specific examples thereof include potassium chloride, sodium chloride, zinc chloride, calcium chloride, barium chloride, chromium chloride, titanium chloride, iron chloride, nickel chloride, magnesium chloride, aluminum sulfate, zinc sulfate, ammonium aluminum sulfate, aluminum potassium sulfate, potassium sulfate, chromium sulfate, cobalt sulfate, iron sulfate, copper sulfate, sodium sulfate, nickel sulfate, magnesium sulfate, manganese sulfate, sodium hydroxide, potassium hydroxide and calcium hydroxide.

Epoxy compounds which are in a liquid state and have a low viscosity at ordinary temperature are suitably used for preparing an emulsion slurry and preferred epoxy compounds include bisphenol type epoxy resins such as bisphenol A, bisphenol F and bisphenol AD.

Examples of hardeners suitably used in the preparation of the emulsion slurry having a low viscosity include polyamides, polyamines, modified polyamines or a mixture thereof. Among these, particularly preferred are polyamide type hardeners comprising a mixture of an amide compound obtained through the reaction of a monomeric fatty acid with an ethyleneamine: $H_2N-(CH_2-CH_2-NH)_n-H$ (wherein n is an integer ranging from 3 to 5) and a polymerized fatty acid polyamide obtained through the reaction of a polymerized fatty acid with the foregoing ethyleneamine, or a reaction mixture obtained by mixing and reacting the monomeric fatty acid, the polymerized fatty acid and the ethyleneamine.

The fillers usable in the present invention are not restricted to specific ones, but preferably those which can be adhered to the epoxy resin and whose particle size can be controlled. Specific examples thereof include silica powder and quartz sand powder. Alternatively, powder of organic substances and microballoons may likewise be used if use of light weight hardened products is required.

In addition, a reactive diluent and/or a hardening promoter may be used as ingredients for preparing the emulsion slurry. Examples of reactive diluents include allyl glycidyl ether, butyl glycidyl ether, styrene oxide, phenyl glycidyl ether, cresyl glycidyl ether, ethylene glycol diglycidyl ether, neopentyl glycol diglycidyl ether, 1,6-hexanediol glycidyl ether and trimethylolpropane triglycidyl ether and examples of hardening promoters are benzyldimethylamine and 2,4,6-tris(dimethylaminomethyl)phenol.

The present invention will further be explained in detail below.

The factor which exerts the greatest influence upon the quantity of shrinkage observed when an emulsion of a resin-filler-water system is hardened is a phenomenon called "water separation", i.e., separation of a part of the water from the emulsion during hardening. To investigate the relation between the water separation and the kinds of soluble salts present in an emulsion, various emulsion slurries were prepared by adding a variety of soluble salts to an emulsion slurry comprising 50 parts by weight of an epoxy resin (a mixture of a bisphenol type epoxy resin and a polyamide hardener) and 100 parts by weight of pure water, and each emulsion slurry was poured in a test tube to a height of 250 mm to determine the thickness of the resulting layer of separated water (degree of water separation). The results thus obtained are plotted against each ion concentration in FIG. 1.

As seen from the results shown in FIG. 1, the greater the amount of the soluble ions, the greater the degree of water separation, but the cohesive force varies depending on the kinds of ions and, therefore, the effect of each ion on the water separation differs from ion to ion. For this reason, the soluble salts used are defined by the following "water separation factor (W.S.F)" which is the sum of weighted water separation properties of every ion constituting the soluble salts:

$$(W.S.F) = (Na^+)/143.4 + (K^+)/247.3 + (Ca^{2+})/274.4 + (Cl^-)/1298.7 + (SO_4^{2-})/1815.9$$

(each ion concentration is expressed in terms of ppm),

Alternatively, the same procedures used above were repeated except that a filtrate obtained by filtering a quartz sand slurry containing 100 parts by weight of each quartz sand powder and 50 parts by weight of water was substituted for the pure water used above. The results thus obtained are summarized in the following Table 1.

TABLE 1

| Kind of Quartz Sand | Concentration (ppm) of Each Ion in the Filtrate (Resin-Water System · Water Separation Test) | | | | | Degree of water Separation (mm) | W.S.F |
|---|---|---|---|---|---|---|---|
| | $SO_4^{2-}$ | $Cl^-$ | $Ca^{2+}$ | $K^+$ | $Na^+$ | | |
| A | 28.53 | trace | 9.53 | 73.67 | 43.03 | 0 | 0.65 |
| B | 62.60 | 10.70 | 19.09 | 21.40 | 59.20 | 0 | 0.61 |
| C | 191.46 | 20.50 | 45.39 | 51.88 | 50.45 | 0 | 0.86 |
| D | 263.36 | 4.30 | 35.90 | 38.18 | 60.46 | 2 | 0.86 |
| E | 313.82 | 22.50 | 58.41 | 73.46 | 63.43 | 2 | 1.14 |
| F | 393.80 | 21.90 | 127.50 | 61.80 | 44.90 | 50 | 1.26 |
| G | 586.80 | 18.90 | 180.30 | 77.20 | 48.20 | 140 | 1.64 |
| H | 611.90 | 30.00 | 195.60 | 49.00 | 63.80 | 140 | 1.72 |

As seen from the data listed in Table 1, the higher the water separation factor weighted by the water separation properties of every ion in the soluble salts used, the greater the degree of water separation and thus, it can be anticipated that the shrinkage during hardening will correspondingly increased. Moreover, the quantity of shrinkage is possibly scattered depending on the kinds and lots of the quartz sands used since the amount of soluble salts present in the quartz sand varies depending on these above factors.

As seen from FIG. 1, the shrinkage during hardening can relatively easily be controlled with relative ease if $SO_4^{2-}$ and/or $Cl^-$ ions are used since these ions exhibit relatively slow change regarding the degree of water separation in proportion to the amount thereof added. In this case, it is practical for each ion to be added to the emulsion in the form of a water-soluble inorganic salt. In this respect, it is preferred that a salt be selected which does not adversely affect other physical properties of the emulsion and which can be easily handled. Examples of such salts include aluminum sulfate.

Table 2 shows the relation between the amount of aluminum sulfate added and the linear shrinkage factor or the water separation factor observed when an emulsion slurry comprising 100 parts by weight of an epoxy resin (a mixture of bisphenol type epoxy resin and a polyamide hardener) and 400 parts by weight of a quartz sand slurry (300 parts by weight of quartz sand powder + 100 parts by weight of water) was hardened while adding various amounts of aluminum sulfate in addition to the soluble salts originally included in the quartz sand slurry.

TABLE 2

| Rate of Aluminum Sulfate Added | 0 | 0.015% | 0.025% | 0.035% | 0.045% |
|---|---|---|---|---|---|
| Water Separation Factor | 0.94 | 1.14 | 1.27 | 1.40 | 1.54 |
| Linear Shrinkage Factor | 0.040% | 0.044% | 0.088% | 0.088% | 0.33% |

(Note)
The rate of aluminum sulfate added is expressed in terms of "% by weight" on the basis of the weight of the quartz sand and the water separation factor is calculated based on the results obtained by analyzing the filtrate of the quartz sand slurry (the same will apply to the following).

The results listed in Tables 1 and 2 clearly indicate that the shrinkage during hardening of the emulsion can be controlled by adjusting the kinds and amounts of soluble salts present in the emulsion. The smaller the amount of the soluble salts, the smaller the quantity of the shrinkage and the higher the dimensional accuracy. However, the water and air permeabilities of the resulting porous material are adversely affected by the control of the shrinkage as will be discussed below in detail.

The relation between soluble salts in the emulsion and the water and air permeabilities will now be explained. Table 3 shows the relation between the amount of aluminum sulfate and the water and air permeabilities of hardened porous materials obtained from an emulsion slurry having the same formulation as that used in the experiment for obtaining the results listed in Table 2 except for using a quartz sand slurry having a relatively small content of soluble salts, to which various amounts of aluminum sulfate are added. In Table 3, the method for determining the rates of water and air permeation herein used is the same as that detailed in the following Examples.

TABLE 3

| Rate of $Al_2(SO_4)_3$ Added (%) | Rate of Water Permeation | Rate of Air Permeation | Shrinkage Factor (%) |
|---|---|---|---|
| 0 | 13'05"/2 l | 1 l/min | 0.040 |
| 0.015 | 7'36"/2 l | 5 l/min | 0.044 |
| 0.025 | 4'40"/2 l | 11 l/min | 0.044 |
| 0.030 | 3'05"/2 l | 17 l/min | 0.044 |
| 0.035 | 2'30"/2 l | 20 l/min | 0.067 |
| 0.040 | 2'20"/2 l | 22 l/min | 0.133 |
| 0.045 | 2'17"/2 l | 24 l/min | 0.155 |
| 0.050 | 1'58"/2 l | 32 l/min | 0.200 |

The foregoing results clearly indicate that the water and air permeabilities and the quantity of shrinkage of a hardened body can be controlled by adjusting the amount of soluble salts to be added. As has been described above, one effect of the addition of soluble salts on the shrinkage factor and the water and air permeabilities is opposite to another effect of such an addition and, therefore, the amount of soluble salts to be added depends on how the resulting hardened body will be used.

Figure 2:
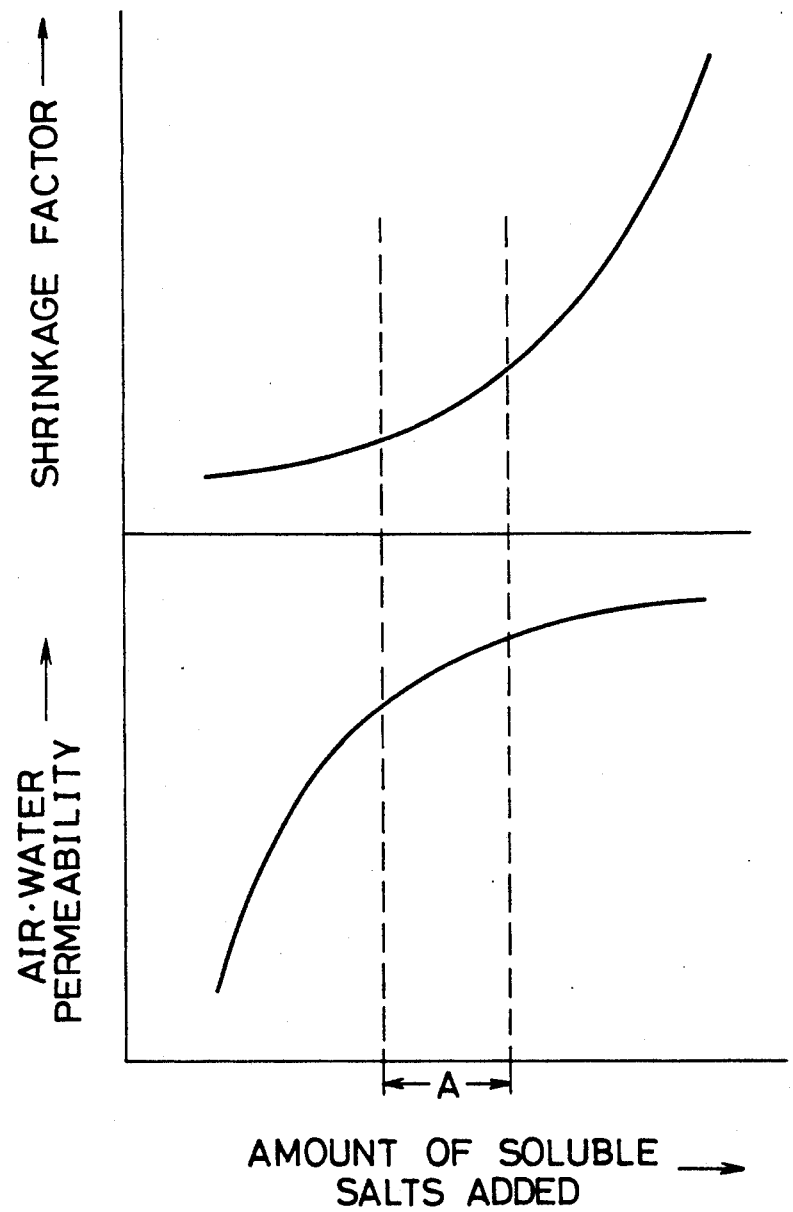
FIG. 2 is a diagram schematically showing the general tendency of the relation between the amount of soluble salts added and the shrinkage factor of a hardened body or the water and air permeabilities thereof.

The general relation between the amount of soluble salts and the shrinkage factor or the water and air permeabilities is schematically shown in FIG. 2.

More specifically, if the amount of soluble salts is small, the water and air permeabilities are abruptly increased, while the shrinkage slowly increases as the amount of the soluble salts increases. On the other hand, if the amount of the soluble salts is great, the water and air permeabilities are gradually increased, while the shrinkage is abruptly increased as the amount of the soluble salts increases. Thus, if the amount of the soluble salts is controlled so that it falls within the range A shown in FIG. 2, a porous material having a relatively low shrinkage and relatively high water and air permeabilities can be obtained.

As to the relation between the amount of the soluble salts and the water and air permeabilities, it seems that, if an emulsion slurry having a low soluble salt content and low cohesion is used, resin particles deposited from the emulsion slurry are not linked with filler particles, the polymerization proceeds to form independent resin particles and accordingly these resin particles are trapped in pores to cause clogging thereof.

Accordingly, pressurized water or air can be forced to pass through pores to remove the trapped resin particles after completion of the hardening in addition to controling the amount of the soluble salts to thus eliminate the scattering in the water and air permeabilities of the resulting porous material. The porous material is obtained by hardening an emulsion slurry while maintaining the water content thereof. Therefore, if the resulting hardened body is subjected to the foregoing treatment for the removal of the trapped resin particles after drying the body, the resin particles in the pores migrate towards the water vaporization surface together with water to thus possibly cause clogging. If the porous material is used, for instance, as a casting mold for pottery, i.e., only one side thereof is used, this problem can be eliminated by drying it from the other side, but if the porous material is used as, for instance, a filtering medium, i.e., both sides thereof are used, the foregoing problem of clogging arises. Moreover, if a large scale porous material having a complicated shape is produced, the dimensional accuracy of the resulting porous material may be impaired due to the shrinkage of the porous body during drying, i.e., so-called "deformation" phenomenon. For this reason, if the hardened porous body is washed, pressurized water or air is desirably passed through the porous body which still contains water, i.e., without drying the same.

Figure 3:
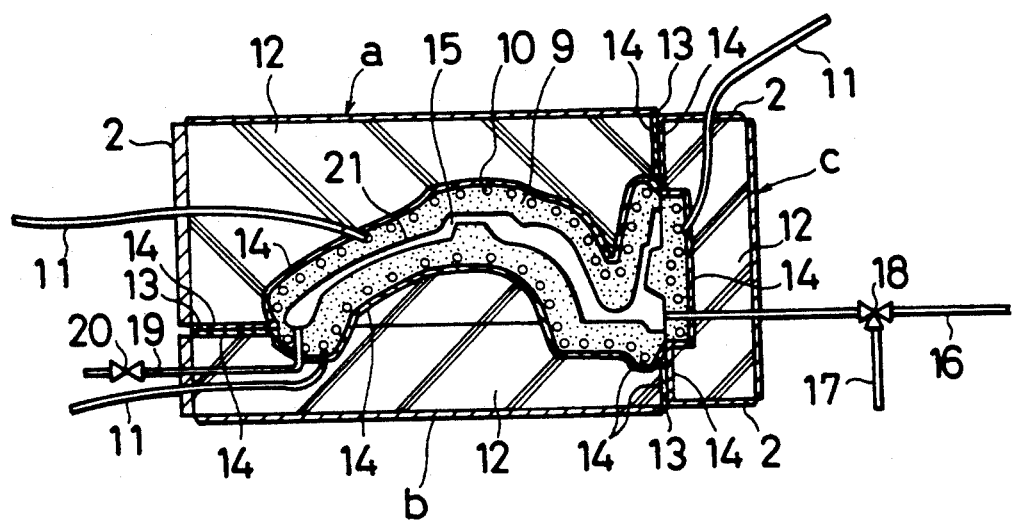
FIG. 3 is a diagram for showing a mold for forming a large scale wash-bowl, illustrated in FIG. 3 of J.P. KOKOKU No. 15364/1990 (U.S. Pat. No. 4,884,959), which comprises three pieces a, b and c clamped together which is produced according to the method of producing a porous material as will be described in the following Examples.

The pressing of the pressurized water or air into porous bodies can be performed by an apparatus having a structure as shown in FIG. 3 of J.P. KOKOKU No. 15364/1990 (U.S. Pat. No. 4,884,959) for the porous materials used as, for instance, a casting mold for pottery.

Figure 4:
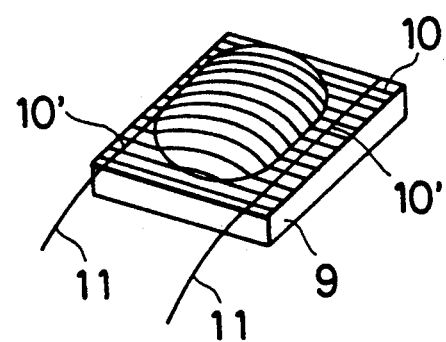
FIG. 4 is a perspective view for illustrating the relation between a porous body 9 having the shape shown in FIG. 3 and channels 10 formed thereon.

In each cast part, as best seen from the section of FIG. 3, a filter layer made of a porous body 9 is fixed to a filler 12 in a reinforced iron box 2 through a resin layer 14 acting as a sealing material. The resin layer 14 is applied to the filler 12 on a matching or joint surface 13 of the mold part. The resin layer may be made of an adhesive known under the trade name of "Adhesive Bond E250" produced by Konishi Kabushiki Kaisha. When the three mold parts are set, they are associated to define a mold cavity 15 by their molding surfaces. Denoted at reference numeral 10 are branch channels or canals which are formed in the porous body 9 for allowing water and air to flow therethrough. As schematically shown in FIG. 4, the branch channels or canals 10 run generally in parallel with a molding surface 21 of each mold part and intersect in a communicating manner with trunk channels or canals 10' which are in communication with pipes 11 extending to the outside of the mold part. Denoted at numeral 16 is a pipe for feeding slip under pressure. The slip feeding pipe 16 is opened into the mold cavity 15 through the side mold part c, for example, as shown, to charge the mold cavity 15 with the slip. During the slip casting operation and the subsequent pressure-molding operation, the water is drained from the porous body 9 to the outside through the branch channels 10. A slip draining pipe 17 is connected to the pipe 16 through a three-way cock 18 to drain the surplus slip to the outside therethrough after the slip has been cast to a sufficient thickness. Denoted at numeral 19 is an aeration pipe for blowing compressed air to reduce the water content of the cast slip. The aeration pipe 19 is opened into the mold cavity 15 through the under mold part b, for example, and is equipped with a check valve 20. The branch channels 10 are supplied with compressed air so as to form a water film between the molded article and the molding surface when the article is to be parted from the mold.

Therefore, if pressurized water or air is pressed into the pipe 11, the porous body 9 is supplied with the pressurized water or air through the branch channels 10 in the porous body which is communicated to the pipe 11 and thus the pores can be washed or cleaned out.

After hardening the emulsion slurry while it still contains water, the washing of the porous body should be performed as soon as possible, preferably within 10 days and more preferably within 5 days. This is because, if the washing of the porous body is not carried out within the term defined above, the resin particles in the pores will be linked to the pore walls to thus cause clogging thereof and it will be difficult to remove such particles linked to the wall through washing.

The pressure of the pressurized water or air should be controlled depending on the diameter of each pore in the porous body. More specifically, if the diameter of a pore is small, a high pressure is employed, while if it is large, it is sufficient to use a low pressure to perform washing. However, the pressure of the pressurized water or air preferably ranges from 0.5 to 10 kg/cm$^2$.

The scattering in the temperature during hardening also becomes a cause of the scattering in the water or air permeability. More specifically, when a large thick porous body is produced, the hardening temperature varies from portion to portion of the porous body even if the temperature of the hardening atmosphere is constant or uniform. For instance, the hardening temperature is rather high within the internal part of the porous body while it is rather low in the vicinity of the superficial part thereof. The resin particles precipitated out of the emulsion at the low temperature part have low thermal velocity, correspondingly they hardly cause linkage with coexisting filler particles and this accordingly results in clogging of the pores in the porous body.

The scattering in the hardening temperature can be reduced by, for instance, lowering the temperature of the hardening atmosphere to thus make the hardening temperature at every part of the porous body low and uniform as a whole. However, if the hardening temperature is reduced, the linkage of the resin particles with the filler particles can hardly be caused as has been described above. Therefore, the amount of the soluble salts to be added should be increased to a level at which the emulsion slurry slightly coheres, and depends on the degree of reduction in the hardening temperature.

If aluminum sulfate is used as the soluble salt to be added, the rate of aluminum sulfate is preferably increased by 0.001 to 0.05% per drop of 10° C. in temperature in the hardening atmosphere.

The present invention will hereinafter be explained in more detail with reference to the following non-limitative working Examples.

EXAMPLE

In the Comparative Example in accordance with the conventional technique and Examples 1 to 5, emulsion slurries having the following formulations were prepared, aluminum sulfate was added to these emulsion slurries in amounts as listed in Table 4, followed by introduction of the mixtures into containers of stainless steel and vigorous stirring at ordinary temperature for 10 minutes to give uniform emulsion slurries.

| | | |
|---|---|---|
| Epikote 815 (Trade Name) | 13 parts by weight | bisphenol type epoxy resin (available from Yuka Shell Epoxy K.K.) |
| Tohmide 245S (Trade Name) | 4.7 parts by weight | polyamide hardener (available from Fuji Kasei Kogyo K.K.) |
| TAP (Trade Name) | 0.3 part by weight | hardening promotor (available from Kayaku Noulli K.K.) |
| quartz sand | 56 parts by weight | 85% by volume thereof has a particle size of not more than 10µ |
| water | 26 parts by weight | |

Each of these emulsion slurries was poured into a proper water-impermeable casting mold, the mold was closed with a cover to prevent the evaporation of the water in the emulsion slurry, allowed to stand at the temperature of the hardening atmosphere (H.A.Temp.) shown in Table 4 for 24 hours (at the hardening atmosphere temperature of 45° C.) or for 48 hours (at the hardening atmosphere temperature of 30° C.) to harden the water-containing slurry and then the resulting hardened body was released from the mold. Thereafter, the hardened bodies were allowed to stand in a dryer maintained at a temperature of 50° C. for 24 hours to remove the water in the bodies through evaporation in the Comparative Example and Examples 1 to 3. On the other hand, immediately after the hardening, the remaining hardened bodies (Examples 4 and 5) were washed by supplying pressurized air of 2 kg/cm² for 5 minutes and then pressurized water of 2 kg/cm² for 5 minutes, the washing cycle being repeated over 5 times, and they were not dried.

Moreover, the effects of the washing treatment and hardening temperature on the physical properties listed in Table 4 are relatively small since a relatively small test piece was used in the Examples. Then molds for forming large scale wash-bowls having a structure shown in J.P. KOKOKU No. 15364/1990 were produced according to the methods used in Examples 1, 4 and 5. As a result, the method used in Example 1 did not provide a mold having good dimensional accuracy, since the resulting hardened body caused a so-called "deformation" phenomenon due to the shrinkage during drying the hardened porous body and accordingly the resulting porous body was slightly deformed. On the other hand, the methods used in Examples 4 and 5 were not accompanied by such a phenomenon at all.

Moreover, pressurized water was passed through the molds produced according to the methods used in Examples 1 and 4 to observe the condition of water which had flowed out from the surface of the porous body and it was found out that they had parts such as thick portions and corners having low water permeability, but the mold produced according to the method used in Example 5 did not suffer from such a problem.

The effects achieved by the present invention can be summarized as follows: (1) In the present invention, a porous material having open pores is produced by adding soluble salts to a mixture which comprises an epoxy compound having at least one epoxy ring in the compound, a hardener capable of reacting with the epoxy compound to harden the compound, a filler and water, stirring the mixture to form an emulsion slurry, and casting the emulsion slurry in a water-impermeable mold to thus harden the water-containing slurry as such. Therefore, the method of the present invention makes it possible to control the shrinkage during hardening and the water and air permeabilities of the resulting porous material having open pores to desired levels respectively while reducing the scattering thereof. (2) The use of a bisphenol type epoxy resin as the epoxy component and a hardener mainly comprising polyamide as the hardener makes it Possible to easily prepare an emulsion slurry having a low viscosity suitable for casting in a water-impermeable mold at an ordinary temperature. (3) Since water-soluble inorganic salts are used as

TABLE 4

| Ex. No. | Rate of Al₂(SO₄)₂ Added (wt%) | Drying | Washing | H.A. Temp (°C.) | Rate of Water P.[1] | Rate of Air P.[2] | S. Fac (%)[3] |
|---|---|---|---|---|---|---|---|
| Comp. Ex. | 0 | ○ | | 45 | 15'20" | 1.2 | 0.11 |
| 1 | 0.025 | ○ | | 45 | 3'20" | 12 | 0.16 |
| 2 | 0.03 | ○ | | 45 | 2'58" | 13 | 0.17 |
| 3 | 0.035 | ○ | | 45 | 2'45" | 15 | 0.20 |
| 4 | 0.025 | | ○ | 45 | 2'48" | 16 | 0.16 |
| 5 | 0.045 | | ○ | 30 | 2'30" | 18 | 0.12 |

[1] Rate of water permeation (Rate of Water P.) was determined by casting a hardened body in a vinyl chloride case of 200 mm × 200 mm × 20 mm used as a water-impermeable mold, passing water at a pressure of 2 kg/cm² through the resulting hardened body saturated with water for 10 minutes and then determining the time required for passing 2 liters of water therethrough, i.e., the rate is expressed in terms of the time thus determined.

[2] Rate of air permeation (Rate of Air P.) was determined by casting a hardened body in a vinyl chloride case of 60 mm Φ × 20 mm used as a water-impermeable mold, then applying an air pressure of 2 kg/cm² to the resulting hardened body saturated with water and determining the amount of air which can pass through the body for 5 minutes and thus the rate of air permeation is expressed in terms of the amount of air thus determined.

[3] The shrinkage factor (S. Fac.) was determined by casting a hardened body in an FRP case of 50 mm (length) × 50 mm (width) × 500 mm (height) used as a water-impermeable mold on which shrinkage marks are engraved at intervals of 450 mm and reading the engraved marks transferred to the surface of the hardened body to calculate the linear shrinkage factor in the direction of height based on the marks.

As seen from the results listed in Table 4, the water and air permeabilities could be substantially improved by the addition of soluble salts without excessively increasing the shrinkage factor as compared with the results obtained in the Comparative Example.

soluble salt components, the soluble salts are uniformly dispersed throughout the emulsion slurry. (4) Since the porous material having open pores obtained by hardening an emulsion slurry without removing the water component thereof is washed by pressing pressurized water and/or air through the pores thereof, the problem of clogging of the pores can effectively be solved. (5) The optimum water and air permeabilities can be ensured depending on the hardening atmosphere temperature, by controlling the amount of the soluble salts such that it is increased when the hardening temperature is low while it is decreased when the hardening temperature is high.

What is claimed is:

1. A method of producing a porous material having open pores which comprises forming an emulsion slurry by stirring a mixture comprising (i) an epoxy compound having at least one epoxy ring in the compound, (ii) a hardener capable of reacting with the epoxy compound to harden the epoxy compound, (iii) a filler and (iv) water, casting the resulting emulsion slurry in a water-impermeable mold and then hardening the slurry while maintaining the water content thereof, and wherein a water-soluble inorganic salt is added to the mixture to produce a porous material having open pores.

2. The method of claim 1 wherein the water-soluble inorganic salt is aluminum sulfate.

3. The method of claim 1 wherein the porous material having open pores obtained by hardening the slurry while maintaining the water content thereof is supplied with pressurized water and/or pressurized air to clean out the pores of the porous material.

4. The method of claim 1 wherein the amount of the water-soluble inorganic salt is controlled such that it is increased when the hardening temperature is low while it is reduced when the hardening temperature is high.

5. The method of claim 1 wherein the epoxy compound is a bisphenol type epoxy resin and the hardener is mainly comprised of a polyamide hardener.

6. The method of claim 5 wherein the water-soluble inorganic salt is aluminum sulfate.

7. The method of claim 5 wherein the porous material having open pores obtained by hardening the slurry while maintaining the water content thereof is supplied with pressurized water and/or pressurized air to clean out the pores of the porous material.

8. The method of claim 5 wherein the amount of the water-soluble inorganic salt is controlled such that it is increased when the hardening temperature is low while it is reduced when the hardening temperature is high.

* * * * *